(12) United States Patent
Coignet et al.

(10) Patent No.: US 10,525,399 B2
(45) Date of Patent: Jan. 7, 2020

(54) SORBENT-LOADED FIBERS FOR HIGH TEMPERATURE ADSORPTION PROCESSES

(71) Applicants: L'Air Liquide, Societe Anonyme pour l'Etude et l'Exploitation des Procedes Georges Claude, Paris (FR); AIR LIQUIDE ADVANCED TECHNOLOGIES U.S. LLC, Houston, TX (US)

(72) Inventors: Philippe A. Coignet, Bear, DE (US); Dean W. Kratzer, Warwick, MD (US); Sudhir S. Kulkarni, Wilmington, DE (US); Edgar S. Sanders, Jr., Newark, DE (US)

(73) Assignees: L'Air Liquide Societe Anonyme Pour L'Etude Et L'Exploitation Des Procedes Georges Claude, Paris (FR); Air Liquide Advanced Technologies U.S. LLC, Houston, TX (US)

( * ) Notice: Subject to any disclaimer, the term of this patent is extended or adjusted under 35 U.S.C. 154(b) by 0 days.

(21) Appl. No.: 15/858,807

(22) Filed: Dec. 29, 2017

(65) Prior Publication Data
US 2018/0296966 A1 Oct. 18, 2018

Related U.S. Application Data

(63) Continuation-in-part of application No. 15/396,644, filed on Apr. 17, 2017, now Pat. No. 10,315,184.

(51) Int. Cl.
| | |
|---|---|
| *B01J 20/22* | (2006.01) |
| *B01D 53/04* | (2006.01) |
| *B01J 20/26* | (2006.01) |
| *B01J 20/18* | (2006.01) |
| *B01J 20/28* | (2006.01) |
| *B01J 20/30* | (2006.01) |
| *B01D 53/02* | (2006.01) |
| *B01D 53/047* | (2006.01) |

(52) U.S. Cl.
CPC ......... *B01D 53/0407* (2013.01); *B01D 53/02* (2013.01); *B01J 20/18* (2013.01); *B01J 20/262* (2013.01); *B01J 20/2803* (2013.01); *B01J 20/28011* (2013.01); *B01J 20/28023* (2013.01); *B01J 20/3078* (2013.01); *B01D 53/047* (2013.01); *B01D 53/0462* (2013.01); *B01D 53/0476* (2013.01); *B01D 2253/102* (2013.01); *B01D 2253/104* (2013.01); *B01D 2253/106* (2013.01); *B01D 2253/108* (2013.01); *B01D 2253/116* (2013.01); *B01D 2253/202* (2013.01); *B01D 2253/204* (2013.01); *B01D 2253/25* (2013.01); *B01D 2253/34* (2013.01); *B01D 2256/10* (2013.01); *B01D 2256/12* (2013.01); *B01D 2256/245* (2013.01); *B01D 2257/102* (2013.01); *B01D 2257/104* (2013.01); *B01D 2257/504* (2013.01); *B01D 2257/80* (2013.01)

(58) Field of Classification Search
CPC ........... B01J 20/22; B01J 20/262; B01J 20/26
USPC ................................................. 502/401, 439
See application file for complete search history.

(56) References Cited

U.S. PATENT DOCUMENTS

| | | | |
|---|---|---|---|
| 5,139,668 | A | 8/1992 | Pan et al. |
| 5,401,706 | A | 3/1995 | Fischer |
| 5,693,230 | A | 12/1997 | Asher |
| 6,451,723 | B1 | 9/2002 | Gaita et al. |
| 6,500,233 | B1 | 12/2002 | Miller et al. |
| 6,592,651 | B2 | 7/2003 | Jain et al. |
| 7,077,891 | B2 | 7/2006 | Jaffe et al. |
| 7,592,284 | B2 | 9/2009 | Zaki et al. |
| 8,133,308 | B2 | 3/2012 | Lively et al. |
| 8,257,474 | B2 | 9/2012 | Lively et al. |
| 8,377,172 | B2 | 2/2013 | Koros et al. |
| 8,673,059 | B2 | 3/2014 | Leta et al. |
| 9,050,582 | B2 | 6/2015 | Barrett et al. |
| 9,446,344 | B2 | 9/2016 | Koch et al. |
| 2010/0313755 | A1 | 12/2010 | Koros et al. |
| 2012/0247330 | A1 | 10/2012 | Chang et al. |
| 2013/0255488 | A1 | 10/2013 | Chang et al. |
| 2013/0305920 | A1 | 11/2013 | Yang et al. |
| 2013/0340620 | A1 | 12/2013 | Sundaram |
| 2016/0263533 | A1 | 9/2016 | Obeh et al. |

FOREIGN PATENT DOCUMENTS

| | | |
|---|---|---|
| WO | WO 2008/150586 | 12/2008 |
| WO | WO 2012 118 759 | 9/2012 |

OTHER PUBLICATIONS

Akhtar, et al., "Structuring adsorbents and catalysts by processing of porous powders," Journal of the European Ceramic Society, 34 (2014), pp. 1643-1666.

(Continued)

*Primary Examiner* — Edward M Johnson
(74) *Attorney, Agent, or Firm* — Christopher J. Cronin (57) ABSTRACT

A composite fiber comprising sorbent particles (at 50 wt %) in a polymeric matrix that comprises a polymer or blend of polymers including at least one thermoplastic polymer, the extrudates being produced by thermal-induced phase separation or diffusion-induced phase separation from a dope suspension of the thermoplastic polymer, an optional solvent and the sorbent particles. The polymer or blend of polymers is able to withstand exposure to temperatures at or above 220° C. without experiencing significant detrimental effects upon the sorbent capacity of the sorbent particles. The fiber exhibits an elongation at break of at least 5%.

42 Claims, 2 Drawing Sheets

(56) References Cited

OTHER PUBLICATIONS

Bhandari, et al., "Dual layer hollow fiber sorbents: Concept, fabrication and characterization," Separation and Purification Technology, 104 (2013), pp. 68-80.
Jeffs, et al., "A polymer of intrinsic microporosity as the active binder to enhance adsorption/separation properties of composite hollow fibres," Microporous and Mesoporous Materials, 170 (2013), pp. 105-112.
Labreche, "Post-spinning infusion of poly(ethyleneimine) into polymer/silica hollow fiber sorbents for carbon dioxide capture," Chemical Engineering Journal, 221 (2013), pp. 166-175.
Lively, et al., "CO2 sorption and desorption performance of thermally cycled hollow fiber sorbents," International Journal of Greenhouse Gas Control, 10 (2012), pp. 285-294.
Lively, et al., "Hollow Fiber Adsorbents for CO2 Removal from Flue Gas," Ind. Eng. Chem. Res., vol. 48, No. 15, 2009, pp. 7314-7324.
Thiruvenkatachari, et al., "Post combustion CO2 capture by carbon fibre monolithic adsorbents," Progress in Energy and Combustion Science, 35 (2009), pp. 438-455.
International Search Report and Written Opinion for PCT/US2017/069055, dated Apr. 10, 2018.

SORBENT-LOADED FIBERS FOR HIGH TEMPERATURE ADSORPTION PROCESSES

CROSS-REFERENCE TO RELATED APPLICATIONS

This is a Continuation-In-Part of Non-Provisional application Ser. No. 15/396,644 originally filed on Dec. 31, 2016 and later accorded a filing date of Apr. 17, 2017.

BACKGROUND

Field of the Invention

The present invention relates to structured adsorbents for gas separation.

Related Art

Adsorbents are typically shaped as small beads (1-5 mm in diameter) and find widespread use in countless applications, from desiccants for insulated windows to hydrogen purification. Current adsorbent systems, however, include a number of drawbacks.

The packing density of a traditional beaded adsorbent bed is limited by the generally spherical shape of the beads. Specifically, the maximum packing density achievable with perfect spheres of identical diameter is 74%. In reality, within a bed of adsorbent beads a distribution of diameters exists. For example, a ratio of the largest diameter to the smallest diameter is may be around 2:1. Also, beads are not necessarily perfectly spherical, so that often, an average packing density of only as much as 65% is achieved.

Because current beaded adsorbent typically use brittle, clay-based binders, such as bentonite, they are intolerant to friction or impacts and consequently are prone to dusting. Given that current beaded adsorbents are typically intolerant to friction and impacts, it is standard practice to limit the gas velocity seen by the average bead to anywhere between 80 and 90% of the fluidization velocity so that fluidization and dusting are avoided. Because the gas velocity is limited, the flow rates of gas during production and depressurization steps are similarly limited. If the flow rates are limited, the speed at which an adsorbent bed can be depressurized and repressurized is also limited. This is especially true for large PSA systems. Therefore, the throughput of conventional beaded adsorbent beds is limited.

The attrition velocity is an indicator of the maximum gas velocity that the beads of conventional adsorbent beds can be subjected to without exhibiting attrition (i.e., dusting) due to friction and impacts. The attrition velocity is directly linked to the average bead-mass. As the bead mass increases, the attrition velocity increases. Therefore, one way to increase the throughput of a beaded adsorbent bed is to increase the mass of the average bead, or to put it another way, to increase the average diameter of the beads. However, increasing the mass or average diameter of the beads comes at the expense of slower kinetics due to diffusion limitations of gas transport within the beads. This is because, as the mass/diameter of a bead increases, the average path length traveled by a plug of gas from the surface of a bead to an available adsorption site within the bead will also increase.

In order to mitigate some of the above-described drawbacks, some have proposed the use of structured adsorbent beds. As opposed to the discrete structure of a beaded bed, the concept of structured adsorbent bed is to form a rigid and/or fixed adsorbent bed or continuous adsorbent structure so as to eliminate the issues related to fluidization. By doing so, the kinetics can be improved by decreasing the characteristic dimension of the adsorbent structure. As an example, a supported adsorbent layer only 0.1 mm thick can have better kinetics than a similar mass of adsorbent configured as 2 mm beads.

One type of structured adsorbent beds proposed is formed by depositing an adsorbent-containing layer onto a non-absorbent substrate (e.g., an aluminum framework). Commercially available desiccant wheels are a prime example of this approach as described in U.S. Pat. No. 5,401,706. Alternatively, U.S. Pat. No. 8,133,308 proposes a supported sorbent fiber. Specifically, a thin layer of a matrix including adsorbent and cellulose acetate is deposited around the outside diameter of a non-sorbent hollow fiber.

Although kinetics can be improved in structured adsorbent beds using substrate-supported adsorbents, the approach suffers several drawbacks. A first drawback is the cost as more manufacturing steps are involved. A second drawback is a lower effective adsorbent packing density because the space occupied by the support/substrate does not significantly participate in the adsorption process.

Alternatively, adsorbents made of a mixed-matrix of adsorbent/polymer have been proposed in order to increase the packing density. For instance, U.S. Pat. No. 6,451,723 discloses the use of polysulfone (PS) to form mixed-matrix 13X-PS adsorbent structures. Although polymeric binders are preferable to brittle clay-based (or similar brittle binders) for ease of bed forming and handling as well as resistance to mechanical and thermal stress, we are not aware of any thermoplastic polymeric binder-based adsorbents that are fully satisfactory when high temperature activation and/or regeneration are required. More specifically, many common adsorbents can require activation/regeneration temperatures well above 200° C. For example, 5A and 13X zeolites as well as activated alumina can require activation temperatures in excess of 300° C., lithium-based zeolites can require activation temperatures in excess of 400° C., and activated carbon or carbon molecular sieve (CMS) adsorbents can require activation temperatures in excess of even 450° C.

Such high activation temperatures may be necessary in order to reach the full adsorbent capacity for the targeted gas. For example, considering a temperature swing adsorption (TSA) system in a front end purification unit of an air separation unit (ASU), 13X zeolite adsorbent can be used to remove $CO_2$ from air after $H_2O$ removal and prior to sending the purified air stream to the cryogenic part of the process. In order to desorb $H_2O$ molecules from the 13X zeolite, on-site activation of the adsorbent at a temperature of around 300° C. is initially performed. Subsequently, assuming that there is no subsequent contamination of the zeolite by water molecules, lower regeneration temperatures are sufficient to desorb $CO_2$ molecules as part of the normal TSA operation. During the life of the adsorbent within the TSA, periodic regenerations around 300° C. may be performed on-site, such as after a shutdown or upon early $CO_2$ breakthrough.

Therefore, in order to take advantage of all of the benefits brought by polymeric binders, there is a need to develop new formulations for an adsorbent-polymer matrix that can sustain high temperature activation/regeneration.

SUMMARY

There is disclosed a flexible high-temperature-rated adsorbent fiber produced by diffusion-driven phase inversion using a soluble thermoplastic polymer or blend of soluble thermoplastic polymers that can withstand repeated hours-long (10 hr+) high temperature exposures at or above 240° C., preferably at or above 250° C., preferably at or above 270° C., preferably at or above 300° C., preferably at or above 330° C. The fiber contains at least 50 wt % adsorbent.

There is also disclosed a composite fiber for sorbent-based fluid separations each of which comprises sorbent particles in a polymeric matrix, wherein: the polymeric matrix comprises a polymeric binder or blend of polymeric binders; the polymeric binder or blend of polymeric binders comprises at least one thermoplastic polymer; the polymeric binder or blend of polymeric binders is able to withstand exposure to temperatures at or above 220° C. without significant detrimental effect upon the sorbent capacity of the sorbent particles; the fiber exhibits an elongation at break of at least 5% (preferably of at least 7% more preferably of at least 10% and even more preferably of at least 15%); said fiber having been produced by temperature-induced phase separation (TIPS) or diffusion-induced phase inversion (DIPS) from a polymer dope suspension that comprises the thermoplastic polymer, optionally dissolved in a solvent in the case of DIPS, and the sorbent particles either suspended in the solvent in the case of DIPS or suspended in thermoplastic polymer while in the molten state in the case of TIPS; the sorbent is an adsorbent or absorbent; and the sorbent particles are present in the extrudates at a concentration of at least 50 wt %.

There is also disclosed a method for activation of either of the above disclosed fiber, comprising the step of heating the fiber to a predetermined activation temperature of the sorbent.

There is also disclosed an adsorbent bed for adsorption-based fluid separations comprising one or more of the fiber activated by the above-disclosed activation method.

There is also disclosed a method for adsorption-based gas separation, comprising the step of separating a feed gas, including at least first and second gases, with one or more of the above-disclosed adsorbent bed to produce a first stream of gas that is enriched in the first gas in comparison to the feed gas and a second stream of gas that is enriched in the second gas in comparison to the feed gas, wherein the feed gas is separated by said one or more adsorbent beds by pressure swing adsorption, pressure-temperature swing adsorption, temperature swing adsorption, vacuum swing adsorption, vacuum-pressure swing adsorption, or electro swing adsorption.

Any one or more of the above-disclosed fibers or methods may include one or more of the following aspects:

the polymeric binder or blend of polymeric binders has a Vicat softening temperature or a heat deflection temperature of at least 220° C.

the polymeric binder or blend of polymeric binders has a Vicat softening temperature or a heat deflection temperature of at least 240° C.

the polymeric binder or blend of polymeric binders has a Vicat softening temperature or a heat deflection temperature of at least 250° C.

the polymeric binder or blend of polymeric binders has a Vicat softening temperature or a heat deflection temperature of at least 270° C.

the polymeric binder or blend of polymeric binders has a Vicat softening temperature or a heat deflection temperature of at least 300° C.

the polymeric binder or blend of polymeric binders has a Vicat softening temperature or a heat deflection temperature of at least 330° C.

the polymeric binder or blend of polymeric binders has a Vicat softening temperature or a heat deflection temperature of at least 360° C.

the polymeric binder or blend of polymeric binders has a Vicat softening temperature or a heat deflection temperature of at least 400° C.

the polymeric binder or blend of polymeric binders has a glass transition temperature(s) of at least 220° C.

the polymeric binder or blend of polymeric binders has a glass transition temperature(s) of at least 240° C.

the polymeric binder or blend of polymeric binders has a glass transition temperature(s) of at least 250° C.

the polymeric binder or blend of polymeric binders has a glass transition temperature(s) of at least 260° C.

the polymeric binder or blend of polymeric binders has a glass transition temperature(s) of at least 270° C.

the polymeric binder or blend of polymeric binders has a glass transition temperature(s) of at least 300° C.

the polymeric binder or blend of polymeric binders has a glass transition temperature(s) of at least 330° C.

the polymeric binder or blend of polymeric binders has a glass transition temperature(s) of at least 360° C.

the polymeric binder or blend of polymeric binders has a glass transition temperature(s) of at least 400° C.

the adsorbent is selected from the group consisting of zeolite, activated carbon, carbon molecular sieve, activated alumina, silica gel, metalorganic frameworks, and amines in solid form.

the thermoplastic polymer is selected from the group consisting of polyetherimides, polyimides, polyamides, polyamide-imides, polyaramids, ladder-type polymers, polybenzimidazole (PBI), polybenzoxazole (PBO), and polybenzothiazole (PBT).

the thermoplastic polymer is selected from the group consisting of polybenzimidazole, polybenzoxazole, and polybenzothiazole.

the polymer dope suspension further comprises one or more types of cross-linking agents, and after formation by diffusion-induced phase separation, the polymeric matrix is caused to be cross-linked with the cross-linking agent(s).

after formation by diffusion-induced phase separation, the fiber are impregnated with one or more types of cross-linking agents and the polymeric matrix is caused to be cross-linked with the cross-linking agent(s).

the polymer dope suspension further comprises one or more polymers insoluble in the solvent.

the soluble thermoplastic polymer and the insoluble polymer(s) have a same molecular formula but the insoluble polymer(s) has a higher molecular weight or degree of crystallinity.

one or more inorganic fillers are incorporated in the polymeric matrix.

the one or more inorganic fillers are selected from carbon fibers and glass fibers.

the polymeric matrix includes a one or more polyaramids and derivatives thereof.

the polymeric matrix includes a one or more polyaramids selected from MPD-I, MPD-IT, DAM-IT, and derivatives thereof.

the predetermined activation temperature is at least 220 C.
the predetermined activation temperature is at least 240 C.
the predetermined activation temperature is at least 250 C.
the predetermined activation temperature is at least 270 C.
the fiber have less than a 4 mm OD, preferably less than 2 mm OD, preferably less than 1 mm OD, preferably less than 750 µm OD, preferably less than 500 µm OD, preferably less than 300 µm OD, preferably less than 150 µm OD.

The use of the flexible high-temperature-rated adsorbent-fiber of claim 1 within an adsorber operated above the attrition velocity The flexible high-temperature-rated adsorbent fiber, which is activated at a temperature inferior to the Tg of the polymeric matrix The flexible high-temperature-rated adsorbent fiber, which is activated at a temperature equal to the Tg of the polymeric matrix The flexible high-temperature-rated adsorbent fiber, which is activated at a temperature superior to the Tg of the polymeric matrix The flexible high-temperature-rated adsorbent fiber, which is activated within its final adsorber vessel The flexible high-temperature-rated adsorbent fiber, which is activated outside its final adsorber vessel The flexible high-temperature-rated adsorbent fiber, which can have circular-section, ellipsoidal-section, star-like-section, etc The flexible high-temperature-rated adsorbent fiber, which can be solid The flexible high-temperature-rated adsorbent fiber, which can be hollow The flexible high-temperature-rated adsorbent fiber, which contains one or multiple adsorbents including zeolite (e.g. A, Y, X, CaBaX, LSX such as Li-LSX, Ca-LSX), activated carbon, carbon molecular sieve, activated alumina, silica gel, MOF, etc The flexible high-temperature-rated adsorbent fiber, which contains catalyst(s)

The flexible high-temperature-rated adsorbent fiber, wherein the polymeric matrix contributes to the capture of the targeted gas by adsorption (e.g. high surface area of the polymeric matrix+affinity between the polymer surface and the targeted gas)

The flexible high-temperature-rated adsorbent fiber, wherein the polymeric matrix contributes to the capture of the targeted gas by absorption (e.g. non-zero solubility of the targeted gas within the polymer matrix)

The flexible high-temperature-rated adsorbent fiber, wherein the polymeric matrix facilitates/favors the transport of the targeted gas to the adsorbent particulates over other gaseous species (e.g. hydrophobic polymeric matrix to exclude water vapor)

The flexible high-temperature-rated adsorbent fiber, which is coated during the forming process (i.e. spinning process) or after the forming process, with a functional layer (e.g. selective layer, protective layer)

The flexible high-temperature-rated adsorbent fiber, prepared using soluble thermoplastic polymer(s) of rigid chain type The flexible high-temperature-rated adsorbent fiber, prepared using soluble thermoplastic polymer(s) of ladder chain type—The flexible high-temperature-rated adsorbent fiber, prepared using only one soluble polymer The flexible high-temperature-rated adsorbent fiber, prepared using a blend of soluble polymers The flexible high-temperature-rated adsorbent fiber, prepared with a polymer dope including one or multiple soluble polymers as well as one or multiple cross-linking agents The flexible high-temperature-rated adsorbent fiber, which is exposed to/impregnated with cross-linking agents after the forming/spinning step The flexible high-temperature-rated adsorbent fiber, prepared using a blend of soluble and insoluble polymers The flexible high-temperature-rated adsorbent fiber, prepared using a blend of soluble and insoluble nuances of a same polymer The flexible high-temperature-rated adsorbent fiber, prepared using a blend of soluble polymer(s) and of its (their) precursors The flexible high-temperature-rated adsorbent fiber, prepared using a blend of insoluble polymer(s) and of its (their) soluble precursors The flexible high-temperature-rated adsorbent fiber, prepared using one or multiple polymer precursors The flexible high-temperature-rated adsorbent fiber, prepared using inorganic fillers such as carbon fiber or glass fiber The flexible high-temperature-rated adsorbent fiber, which contains polyaramid(s) or polyaramid derivatives The flexible high-temperature-rated adsorbent fiber, prepared with soluble polyaramid(s) (e.g. MPD-I, MPD-IT, DAM-IT) or with polyaramid derivatives The flexible high-temperature-rated adsorbent fiber, prepared using polyaramid(s) precursors The flexible high-temperature-rated adsorbent fiber, which contains polyetherimide(s) (PEI) or any PEI derivatives The flexible high-temperature-rated adsorbent fiber, prepared with polyetherimide(s) (PEI) or any of its derivatives The flexible high-temperature-rated adsorbent fiber, prepared using polyetherimide(s) (PEI) precursors or any of its derivatives' precursors The flexible high-temperature-rated adsorbent fiber, which contains polyamide-imide(s) (PAI) or any of its derivatives The flexible high-temperature-rated adsorbent fiber, prepared with polyamide-so (PAI) or any of its derivatives The flexible high-temperature-rated adsorbent fiber, prepared using polyamide-imide(s) (PAI) precursors or any of its derivatives' precursors The flexible high-temperature-rated adsorbent fiber, which contains Polybenzimidazole (PBI) or any of its derivatives The flexible high-temperature-rated adsorbent fiber, with using Polybenzimidazole (PBI) or any of its derivatives The flexible high-temperature-rated adsorbent fiber, prepared using Polybenzimidazole (PBI) precursors or any of its derivatives' precursors The flexible high-temperature-rated adsorbent fiber, which contains Polybenzoxazole (PBO) or any of its derivatives The flexible high-temperature-rated adsorbent fiber, prepared with Polybenzoxazole (PBO) or any of its derivatives The flexible high-temperature-rated adsorbent fiber, prepared using Polybenzoxazole (PBO) precursors or any of its derivatives' precursors The flexible high-temperature-rated adsorbent fiber, which contains Polybenzothiazole (PBT) or any of its derivatives The flexible high-temperature-rated adsorbent fiber, prepared with Polybenzothiazole (PBT) or any of its derivatives The flexible high-temperature-rated adsorbent fiber, prepared using Polybenzothiazole (PBT) precursors or any of its derivatives' precursors The flexible high-temperature-rated adsorbent fiber, prepared using cross-linker agents The flexible high-temperature-rated adsorbent fiber, prepared by subjecting the fiber to cross-linking reactions during the adsorbent activation step The flexible high-temperature-rated adsorbent fiber, prepared by:
  Forming a polymeric dope by mixing a soluble polymer in a solvent system
  Blending the resulting polymeric dope with an adsorbent powder
  Degassing the resulting adsorbent-polymeric dope
  Extruding the adsorbent-polymeric dope through a spinneret or die
  Coagulating the extruded fiber within a coagulant bath so as to remove the polymer-solvent and solidify the matrix adsorbent-polymer
  Further extracting any remaining solvent still present after coagulation
  Subjecting the high-temperature-rated adsorbent fiber to a high-temperature activation step (e.g. 240° C.+, 250° C.+, 270° C.+, etc)

The flexible high-temperature-rated adsorbent fiber, prepared by:
  Forming a polymeric dope by mixing a soluble polymer in a solvent system
  Blending the resulting polymeric dope with an adsorbent powder
  Degassing the resulting adsorbent-polymeric dope
  Extruding the adsorbent-polymeric dope through a spinneret or die
  Coagulating the extruded fiber within a coagulant bath so as to remove the polymer-solvent and solidify the matrix adsorbent-polymer
  Exposing the formed flexible fiber to a second solvent system containing a cross-linking agent
  Washing the fiber
  Subjecting the high-temperature-rated adsorbent fiber to a high-temperature activation step (e.g. 240° C.+, 250° C.+, 270° C.+, etc)

The flexible high-temperature-rated adsorbent fiber, prepared by:
  Forming a polymeric dope by mixing a soluble polymer in a solvent system
  Blending the resulting polymeric dope with an adsorbent powder
  Degassing the resulting adsorbent-polymeric dope
  Extruding the adsorbent-polymeric dope through a spinneret or die
  Coagulating the extruded fiber within a coagulant bath so as to remove the polymer-solvent and solidify the matrix adsorbent-polymer
  Exposing the formed fiber to a second solvent system containing one or multiple polymer precursors
  Washing the fiber with a solvent in which both the extruded-fiber and the polymer precursor are insoluble
  Subjecting the high-temperature-rated adsorbent-fiber to a high-temperature activation step (e.g. 240° C.+, 250° C.+, 270° C.+, etc)

The flexible high-temperature-rated adsorbent fiber, is prepared by:
  Forming a polymeric dope by mixing a soluble polymer in a solvent system containing a specific salt so as to transform/denature a zeolite adsorbent by ionic exchange
  Blending the resulting polymeric dope with a zeolite powder
  Degassing the resulting adsorbent-polymeric dope
  Extruding the adsorbent-polymeric dope through a spinneret or die
  Coagulating the extruded fiber within a coagulant bath so as to remove the polymer-solvent and solidify the matrix adsorbent-polymer
  Further extracting any remaining solvent still present after coagulation
  Subjecting the high-temperature-rated adsorbent fiber to a high-temperature activation step (e.g. 240° C.+, 250° C.+, 270° C.+, etc)

The flexible high-temperature-rated adsorbent fiber, is prepared by:
  Forming a polymeric dope by mixing a soluble polymer in a solvent system free of salt
  Blending the resulting polymeric dope with a zeolite powder
  Degassing the resulting adsorbent-polymeric dope
  Extruding the adsorbent-polymeric dope through a spinneret or die
  Coagulating the extruded fiber within a coagulant bath so as to remove the polymer-solvent and solidify the matrix adsorbent-polymer
  Further extracting any remaining solvent still present after coagulation
  Washing multiple times the resulting fiber in an aqueous—or non-aqueous—solution charged with specific ionic species so as to transform/denature the zeolite by ionic exchange
  Subjecting the high-temperature-rated adsorbent fiber to a high-temperature activation step (e.g. 240° C.+, 250° C.+, 270° C.+, etc)

A method for making a reinforced flexible high-temperature-rated adsorbent fiber, the method comprising
  Forming a polymeric dope by mixing a soluble polymer in a solvent system (e.g. MPD-IT in NMP)
  Swelling in the same or different solvent system insoluble polymeric fiber and/or fibrils (e.g. MPD-I or PPD-T fibrils)
  Blending the swollen insoluble fiber/fibrils with the polymeric dope so as to form an homogeneous composite dope
  Simultaneously or sequentially blending the resulting composite polymeric dope with an adsorbent powder
  Degassing the resulting adsorbent-polymeric dope
  Extruding the adsorbent-polymeric dope through a spinneret or die
  Coagulating the adsorbent fiber within a coagulant bath so as to remove the polymer-solvent and solidify the matrix adsorbent-polymer
  Further extracting any remaining solvent still present after coagulation Subjecting the adsorbent fiber to a high-temperature activation step (e.g. 240° C.+, 250° C.+, 270° C.+, etc)

The flexible high-temperature-rated adsorbent fiber, which is suitable for cryogenic/cold operation The use of the flexible high-temperature-rated adsorbent fiber in cryogenic/cold operation The use of the flexible high-temperature-rated adsorbent fiber within adsorbent cloths and/or adsorbent fabrics The use of the flexible high-temperature-rated adsorbent fiber in an axial flow adsorber (or adsorbent bed)

The use of the flexible high-temperature-rated adsorbent fiber in a radial flow adsorber (or adsorbent bed)

The use of the flexible high-temperature-rated adsorbent fiber within any adsorption processes: PSA, PTSA, TSA, VSA, VPSA, ESA, RCPSA, RCTSA, etc The use of the flexible high-temperature-rated adsorbent fiber for gas separations, including:

PSA for H2 purification (e.g. SMR)

PSA for CO2 removal from N2

PSA for CO2 removal from CH4

TSA for air de-humidification and de-carbonation (e.g. ASU)

PSA, VSA, VPSA for N2 capture from air (e.g. O2 production)

The use of the flexible high-temperature-rated adsorbent fiber for separations in liquid phase (or any other condensed phase)

The use of the flexible high-temperature-rated adsorbent fiber for the separation of vapors The use of the flexible high-temperature-rated adsorbent fiber for stationary applications The use of the flexible high-temperature-rated adsorbent fiber for mobile applications (e.g. OBOGS)

Any other type of flexible high-temperature rated adsorbent structures using the same formulation than that of the flexible high-temperature-rated adsorbent fiber Flexible flat sheet Flexible corrugated sheet Flexible honeycomb

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

We propose solid fiber for sorbent-based fluid separations (i.e., adsorption-based or absorption-based) that are made of sorbent particles in a polymeric matrix that are made via diffusion-induced phase inversion or thermal-induced phase inversion wherein the polymer or polymers of the matrix exhibit an elongation at break of at least 5%. The fiber are suitable for relatively high temperature activation and/or regeneration for adsorption-based fluid separation processes. More particularly, the polymeric matrix comprises a polymeric binder or blend of polymeric binders and can withstand exposure to activation or regeneration temperatures at or above 220° C. without significant detrimental effects upon the sorbent (such as adsorbent) capacity of the sorbent particles (hereinafter "heat exposure property"). The "heat exposure property" of the polymeric binder or blend of polymeric binders is defined as having a Vicat softening temperature (Ts), a heat deflection temperature (HDT), and/or a glass transition temperature (Tg) of at least 220° C. Typically, the Tg, HDT, and/or Ts are all above the activation and regeneration temperature of the sorbent. Even more typically, one or more of these properties are at least 10° C. or even at least 20° C. higher than the activation and regeneration temperature of the sorbent. The polymeric binder or blend of polymeric binders typically withstand activation temperatures of at least 220° C., without significantly deteriorating the sorbent capacity of the sorbent particles for time periods of at least 1 hour, of at least 5 hours, or even as much as 10 hours (or more). After activation, typically the sorbent (such as adsorbent) particles have retained at least 95% of the sorbent (such as adsorbent) capacity.

The $T_s$ of a polymer may be determined according to the test procedure outlined in ASTM D 1525. ASTM D 1525 calls for measuring the temperature at which a flat-ended needle penetrates into a portion of the polymer being heated (in a controlled manner) to a specified depth.

The $T_g$ of a polymer is the temperature above which a polymer is in a rubbery state and below which a polymer is in its glassy state. Those of ordinary skill in the art will clearly recognize that the $T_g$ may be determined by differential scanning calorimetry (DSC) using a differential scanning calorimeter.

Those of ordinary skill in the art will clearly recognize that the elongation at break of a polymer may be determined by measuring the length of a portion of the material undergoing testing before stretching it, measuring the length of the portion after stretching, and calculating the ratio of the latter to the former.

The HDT of a polymer may be determined according to the test procedure outlined in ASTM D648. ASTM D648 calls for application of an outer fiber stress, during testing, of either 0.45 MPa or 1.8 MPa and a controlled ramping up of temperature until a deflection of a given amount occurs.

The formulation may include one or more polymeric binders (either individually or as a whole) meeting the requisite heat exposure property. Those of ordinary skill in the art will recognize that the formulation may include two or more polymeric binders in which fewer than all of the polymeric binders have the requisite heat exposure property and one or more of the other binders do not have the requisite heat exposure property, but the blend of polymeric binders as a whole meet the requisite heat exposure property. For those polymeric binders that do not possess the requisite heat exposure property, it/they may be included in the formulation for reasons other than suitability for relatively high temperature activation and/or regeneration. For example, they may be included for their tensile strength or pore-forming properties.

The binder or blend of binders meeting the requisite heat exposure property are thermoplastic. A thermoplastic material is a resin that reversibly becomes plastic upon heating and hardens upon cooling. These materials may be distinguished from thermosetting materials which are resins that irreversibly cross-link upon heating.

Thermoplastic binders or blends of thermoplastic binders meeting the requisite heat exposure property render them highly satisfactory for use in forming solid fiber made of the novel formulations. More particularly, they exhibit a satisfactorily high elongation at break allowing the formed fiber to be processed and handled after phase inversion without breaking. A solid fiber meeting made of a formulation containing a sorbent (such as an adsorbent) and a polymeric binder or blend of polymeric binders with a relatively high $T_s$ but an elongation at break of less than 5% will be easily broken during processing and handling after phase inversion. Typically, the thermoplastic binder or blend of thermoplastic binders of the invention exhibit an elongation at break of no less than 7% and typically exhibit an elongation at break of 10-15%.

Because they are made at least partially of a thermoplastic binder, the novel fiber are highly satisfactory for use in adsorbent processes operated with relatively fast cycle times, with relatively large adsorbent beds, and/or with relatively high flow rates of gas to be treated. This is because the attrition velocity for thermoplastic binders is much higher than that of conventional beaded adsorbents made from a relatively brittle, non-polymeric binder such as bentonite. More importantly, the novel fiber are suitable or relatively high temperature activation and/or regeneration Phase inversion methods useful for forming the fiber include diffusion induced phase separation (DIPS) and temperature induced phase separation (TIPS).

For fiber manufactured by DIPS, the selected polymeric binder(s) is(are) are dissolved in a suitable solvent. Suitable solvents include those in which at least 98 wt % of the polymeric binder(s) dissolve. Depending on the polymeric binder(s) chosen and without limiting the scope of the invention, particular solvents include non-polar solvents, polar protic solvents as well as polar aprotic solvents. The latter include N-methyl-2-pyrrolidone (NMP), N,N-Dimethylformamide (DMF), N,N-Dimethylacetamide (DMAc), and N,N-Dimethylsulfoxide (DMSO), and combinations thereof. The solvent may also include an amount of a non-solvent (i.e., one that does not dissolve the polymeric binder(s)), but which is miscible with the solvent, in order to produce a single phase that is close to binodal. The composition of the polymeric binder(s) and solvent is hereinafter referred to as a polymer dope suspension.

The dope suspension may include one or more salts added to the solvent(s) in order to facilitate the polymer dissolution, such as $CaCl_2$ or LiCl. The combination of solvent(s) and salt(s) should also be selected with the nature of the adsorbent used. For example, it may be desirable to include no salt with certain zeolites in order to prevent any ion exchange processes that would ultimately denature or transform the zeolite. On the other hand, salt(s) may be added so as to intentionally transform the zeolite by ionic exchange while in the adsorbent dope (made up of the polymeric binder(s), solvent(s), optional salts, adsorbent, and optional filler). Alternatively, no salt may be intentionally added to the dope suspension but the formed composite-adsorbent fiber may be subjected to further processing after formation, such as ion exchange in order to obtain the targeted adsorption properties. Such ion exchange processes are well known and maybe applied to the formed fiber without significant modification due to the chemical inertness of the utilized polymer.

The dope suspension may include one or more organic and/or one or more inorganic fillers. For example, the adsorbent dope may include a filler comprising dry-spun fibrils made of a thermoplastic polymer. Fibrils made by dry-spinning inherently exhibit a high degree of crystallinity. Through inclusion of such high crystallinity fibrils, the flexibility of the inventive fiber may be improved. One type of inorganic filler includes relatively short carbon fiber, such as 5-20 µm long, in amounts up to 20 wt % so as to increase the mechanical properties of the sorbent extrudates. An alternative filler is fiberglass. The organic fillers may be a polymer that is soluble or insoluble in the solvent of the polymer dope. The insoluble polymeric filler includes but is not limited to dry-spun fibrils made of a thermoplastic polymer. Examples of insoluble polymeric filler include poly(para-aramid) pulp or fibrils, (such as fiber made of Kevlar type 953 at a length of 500-1,000 µm). Inclusion of an insoluble poly(para-aramid) to a dissolved poly(meta-aramid) may allow the poly(para-aramid) to swell and thereby help to lock/entangle the poly(meta-aramid) and poly(para-aramid) polymers chains within one another while improving the mechanical properties of the sorbent extrudates. In order to enhance compatibility of blending insoluble polymeric fillers with the soluble thermoplastic polymer of the polymer dope, the insoluble polymeric filler typically belongs to the same general class of polymers as the dissolved thermoplastic polymer in the polymer dope. The insoluble polymeric filler may be identical to the soluble thermoplastic polymer of the polymer dope but have a higher molecular weight than that of the soluble thermoplastic polymer or have a higher degree of crystallinity than that of the soluble thermplastic polymer. For example, a high degree of crystallinity may be achieved with rigid-chain polymers such as in MPD-I fiber produced by dry spinning.

The dope suspension may include a cross-linking agent and cross-linking promoter in order to cross-link the polymeric binder(s) and to thereby increase the mechanical strength and/or the chemical resistance of the resultant fiber. In such a case, the cross-linking reaction is performed after extrusion of the fiber. One of ordinary skill in the art will recognize that any cross-linking agent known in the field of hollow fiber membranes may be used in the invention. Particular examples of cross-linking promoters include metal oxides and elemental, oligomeric, or polymeric sulfur. Alternatively, the adsorbent dope may include the cross-linking promoter but not the cross-linking agent. In such a case, the extruded fiber may be exposed to the corresponding cross-linking agent by coating it with a composition including the cross-linking agent and subsequently cross-linking it.

Regardless of how the polymeric binder(s) is cross-linked, in a particular embodiment, cross-linking may be carried out on a relatively low molecular weight polymeric binder(s) instead of on a polymeric binder(s) having a molecular weight more typical of those used to form hollow fiber for gas separation membranes. In this manner, chain segments of such a low molecular weight polymeric binder may be cross-linked in order to result in a cross-linked polymeric binder whose overall molecular weight more or less approximates those typically exhibited by polymeric binders used in forming hollow fiber for gas separation membranes.

This particular embodiment immediately above, where the thermoplastic binder in the solidified sorbent fiber is cross-linked with a cross-linking agent and cross-linking promoter, may be distinguished from solidified adsorbent beads including a non-cross-linked thermosetting polymer. During relatively high temperature activation and/or regeneration of the adsorbent in such an adsorbent/thermosetting polymer matrix beads, the thermosetting polymer would be expected to cross-link during exposure to such relatively high temperatures. One of ordinary skill in the art will recognize that the structure and expected gas separation performance of a bed of such adsorbent/thermosetting polymer matrix adsorbent beads would be irreversibly changed. Thus, such a skilled artisan would not have any expectation that such a bed could be successfully used for the intended separation of fluids.

In an alternative to the inclusion of the already-polymerized polymeric binder (exhibiting the requisite heat exposure property) in the polymer dope, the dope suspension may include precursor(s) to the polymeric binder (where such polymeric binder would exhibit the requisite heat exposure property upon polymerization from the precursor(s)) and the intended polymeric binder is polymerized from the corresponding polymeric precursor during or after phase inversion.

In another alternative, instead of a polymeric binder(s) (exhibiting the requisite heat exposure property) having a molecular weight more typical of those used to form hollow fiber for gas separation membranes, the dope suspension may include a relatively low molecular weight polymeric binder(s) and its molecular weight is increased through heating (such as during activation of the extrudates) which promotes thermal cyclization reactions.

Some polymers may exhibit a satisfactory $T_s$, Vikat softening temperature, or $T_g$ but have poor solubility in the solvent used in the dope suspension. For example, they may require dangerous solvents or solvents that are difficult to manage in view of environmental regulation, or they may insoluble or only dissolve to an unsatisfactory extent and prevent fiber formation through phase inversion. The three alternatives described immediately above provide a solution to this problem. This is because the polymer precursor or relatively low weight polymers are much more likely to exhibit satisfactory solubility in solvents typically used in fiber manufactured by phase inversion. Thus, the final polymeric binder (exhibiting the requisite heat exposure property) is ultimately caused to be present in the fiber but there is no problem of dissolution of the polymeric or monomeric content in the dope suspension.

The dissolved polymeric binder(s) is then mixed with a sorbent in a powder form. The type of sorbent is not limited and may include any of those known to those skilled in the art of adsorption-based liquid or gas separation. Typically, the sorbent has a particle size of less than or equal to 100 μm, typically less than or equal to 10 μm, and sometimes even less than or equal to 1 μm. It may be milled in order to achieve the desired size distribution.

The dope suspension may optionally be degassed under heat and/or vacuum prior to extrusion through a die or spinneret. The dope suspension is forced through a die or spinneret into a coagulant medium where the solvent(s) is removed from the adsorbent dope thus inducing the polymer matrix to solidify. The polymeric binder loading and amount of solvent are carefully controlled in order to produce a single phase that is close to binodal. That way, as the ejected bore fluid and extruded spin dope composition exit the spinneret and traverse through an optional air gap, solvent evaporating from the core spin dope composition either causes the exterior of the dope solution to solidify or brings it closer to solidification.

The coagulation bath (also known as the coagulant) constitutes a non-solvent or a poor solvent for the polymer while at the same time a good solvent for the solvent within the core spin dope composition. As the nascent fiber is plunged into a coagulant bath containing non-solvent, exchange of solvent and non-solvent from the fiber to the bath and vice-versa completes the solidification of the fiber to form a two-phase sub-structure of solid polymer and liquid solvent/non-solvent. In this manner, the liquid coagulant bath facilitates phase inversion (i.e., solidification) of the still-dissolved core spin dope polymer. In selecting an appropriate coagulant medium composition and temperature, the nature of the adsorbent dope may be considered. After coagulation, the resulting adsorbent/polymer matrix can be best described as an opened-cell structure. Specifically, the polymer matrix encapsulates the adsorbent particulates in an opened-cell structure or cage structure, without sticking to the adsorbent particles so as to promote good mass transport.

During the extrusion process, the solidified fiber may be pulled, for instance by pulling it onto and around a rotating barrel, so that the fiber coagulates under tension. Coagulating the adsorbent dope under tension can promote polymer chain alignment, thus creating additional hydrogen bonds and ultimately reinforcing the resulting adsorbent fiber. One example of a polymeric binder exhibiting such alignment under tension is poly meta-aramids. The draw ratio may be adjusted, among other things, so as to create an opened fiber skin characterized by a relatively higher polymer content than at the fiber core. Such a skin mitigates the risk of dust formation while still allowing good mass transfer.

As seen above, the polymeric binder (exhibiting the requisite heat exposure property) must be soluble in a solvent suitable for formation into fiber via DIPS. Alternatively, the polymeric binder in the resultant fiber must be able to be formed from its constituent precursor (via chain-lengthening as explained above) or monomers (via polymerization) after extrusion where the constituent precursor or monomers itself/themselves are soluble in a solvent suitable for formation into fiber via DIPS. We have found that many polymers exhibiting the required Ts are not soluble enough to allow them to be formed by DIPS. Conversely, many polymers soluble enough to allow them to be formed by DIPS do not exhibit the required Ts. For those polymers that are soluble enough to allow formation of fiber via DIPS and which exhibit the required Ts, many do not exhibit an elongation at break of at least 5%.

Now that DIPS has been described, we will proceed to describe formation of the fiber by TIPS.

Those skilled in the art will understand that the fiber may be formed by TIPS by heating a blend of the polymeric binder (or blend of polymeric binders) and the sorbent (such as an adsorbent) above the melting temperature of the polymeric binder, or in the case of two or more polymeric binders, above the melting temperature of the highest-melting point polymeric binder in the formulation. The sorbent and molten polymeric binder is then extruded through a spinneret in fiber form and the nascent fiber is allowed to traverse through a cooling medium such as water and/or air so that the nascent fiber solidifies. Because there is no need to dissolve the polymeric binder(s) in the formulation, there is no need for a solvent. Non-melting additives (from those described above) may be included in the formulation. By non-melting, we mean that they have a melting point higher than the temperature to which the formulation is heated and remain in a solid state during extrusion from the spinneret. The solidified fiber may be tensioned by pulling them around a rotating barrel.

Whether the fiber are formed by DIPS or TRIPS, a structure suitable for performing sorption-based separation may be formed by skeining the fiber, winding the fiber around a mandrel, weaving the fiber into a fabric, collecting a mass of the fiber are forcing the mass into a container, or pressing a mass of them into the form of a non-woven fabric. The type of sorption-base gas separation process is not limited and includes pressure swing adsorption (PSA), temperature swing adsorption (TSA), vacuum swing adsorption (VSA), vacuum-pressure swing adsorption (VPSA), and electric swing adsorption (ESA). Such structures and processes may be stationary or mobile. While the structure used for sorption-base separation is typically used for gas separations, it may also be used for vapor separations or condensed phase separations.

Multiple polymers or families of polymers may be considered for use as either the polymeric binder having the requisite heat exposure property or in a blend of polymers whose combination exhibits the requisite heat exposure property, including polyetherimides, polyimides, polyamides, polyamide-imides, polyaramids, ladder-type poly- mers, polybenzimidazole (FBI), polybenzoxazole (PBO), and polybenzothiazole (PBT).

A particularly suitable example of a polyimide is the polymer of formula (I) that is commercially available from Evonik Fibres GmbH under the trademark P84®.

P84 has a reported Tg of 315° C. and an elongation at break of 30%. Another particularly suitable polyimide is commercially available from Evonik Fibres GmbH under the trademark P84®NT. P84®NT has a reported Tg of 337° C., an elongation at break of 10%, and an HDT of 319-343° C.

Polyamide-imides exhibit satisfactory solubility in a variety of ordinary solvents and retain their toughness, high strength and high stiffness generally up to 275° C. A particularly suitable example of a polyamide-imide is the polymer of formula (II) that is commercially available from Solvay under trade name Torlon®. For example, one particular type of Torlon® (4203L) has a reported an elongation of 7.6%, an HDT of 278° C. (ASTM D648) and a Tg of 277° C. The structure of Torlon is according to formula (II):

Particularly suitable polyaramids include meta-aramids, examples of which include: MPD-I (poly m-phenylene isophthalamide) or MPD-IT (the condensation polymerization product of m-phenylenediamine (MPD), isophthaloyl chloride (I) and terephthaloyl chloride (T)). MPD-I is commercially available from DuPont under the trademark Nomex® and has the structure according to formula (III):

We have measured a $T_g$ for MPD-IT of about 275° C.

Although a fiber made of the sorbent particles and a polymeric matrix wholly comprised of PBI would not possess the requisite elongation at break, PBI (poly[2,2'-(m-phenylen)-5,5'-bisbenzimidazole]) may be used to increase the thermal resistance of other polymeric binders possessing a suitably high elongation at break (i.e., greater than 7%) and a $T_s$, $T_g$, Vikat or softening temperature of at least 200° C. (or more). The structure of PBI is according to formula (IV):

PBI has exceptional thermal and chemical stability and it exhibits an HDT of about 435° C. at 1.8 MPa as well as a $T_g$ of 427° C. and can be exposed to temperatures up to 540° C. PBI does not melt but degrades around 760° C. under pyrolysis. Given its relatively low elongation at breaks (3%), PBI alone, or with a filler, is best suited for solid/rigid monolith structures or beads as well as any structures that require only little flexibility (as opposed to fiber). Its thermal stability makes it a prime choice for O2 VSA using lithium based zeolite which requires activation temperatures in excess of 400° C.

PBI can be used within blends to increase the temperature rating of less heat resistant polymers. For instance, without limiting the scope of the invention, PBI can be blended with polyetherimide (PEI) or polyamide-imide (PAI) so as to increase PEI's or PAI's Tg.

PBO (poly(p-phenylene-2,6-benzoxazole)) has the structure according to formula (V):

PBT (poly(p-phenylene-2,6-benzothiazole)) has the structure according to formula (VI):

(VI)

Examples of ladder-type polymers include benzimidazobenzo-phenanthroline-type ladder polymer (BBL) and its derivatives (e.g. BBL-N, BBL-P, BBL-DBF, BBL-AQ), polyhydroquinoxaline structures and semi-ladder polybenzimidazobenzophenanthroline (BBB). BBL has the structure according to formula (VII):

(VII)

As mentioned above, blends of polymeric binders mayn be envisioned for different purposes. Specifically, blends of polymers can be formulated so as to better tune the final polymer matrix properties. As previously mentioned, high-temperature rated polymers can be added to increase the thermal performance of a lower temperature rated thermoplastic polymer. For instance, 50 wt % FBI can be used in PAI so as to increase the Tg of PAI. Alternatively, permeable polymers can be added to non permeable polymers so as to improve gas diffusion. For instance, 20 wt % DAM-IT can be used in MPD-IT to favor gas transport as MPD-IT can be impermeable to gases.

The sorbent particles in the extrudates include any of those known in the field of sorbent-based fluid separation (i.e., adsorption-based or absorption-based), and in particular, gas separation. Non-limiting types of adsorbents includes zeolites (e.g., types A, Y, X, CaBaX, or LSX such as Li-LSX, Ca-LSX), activated carbon, carbon molecular sieve, activated alumina, silica gel, metallorganic frameworks (MOF) and amines in solid form. By amines in solid form, we mean amines that have been deposited upon a solid substrate or solid particles of amines that are not supported on a substrate.

In the case of adsorption-based fluid separations, the fiber may be formed as a discrete adsorbent bed. The adsorbent bed may be a stationary one or a mobile one (such as in On Board Oxygen Generation Systems or OBOGS). The adsorption-based fluid separation process may use the adsorbent bed as a non-fluidized bed, as a fluidized bed, or as a circulating bed. The adsorption process may be pressure swing adsorption (PSA), pressure-temperature swing adsorption (PTSA), temperature swing adsorption (TSA), vacuum swing adsorption (VSA), vacuum-pressure swing adsorption (VPSA), electro swing adsorption (ESA), rapid cycle pressure swing adsorption (RCPSA), or rapid cycle temperature swing adsorption (RCTSA). In a PSA process, particular non-limiting examples of a gas separation process performed using the adsorbent bed include purification of H2 (particularly for obtaining H2 from syngas or a syngas process gas such as one primarily containing H2, CO, N2, and CH4), for N2 capture from air, for CO2 removal from N2, and CO2 removal from CH4. In a TSA process, particular non-limiting examples of gas separation processes performed using the adsorbent bed includes de-humidification of air and de-carbonation of air such as in an air separation unit (such as in the front end purification unit of a cryogenic distillation-based ASU). The adsorbent bed may also be used in a VSA or VPSA process for capture of N2 capture from air to produce O2. One particular separation process is the front end purification (FEP) process for purification of air for feeding to a cryogenic distillation-based air separation unit (ASU) where amounts of CO2, H2O, and volatile organic compounds (VOCs) are removed from air to produce a feed for the ASU. The adsorbent bed may also be used for separation of liquids, such as condensed gases. Also, the adsorbent may be used for separation of vapors.

The invention exhibits several advantages.

The present invention results in adsorbent structures that are relatively attrition resistant or dusting free. By using a polymeric binder or blend of polymeric binders, significant advantages over traditional clay-based binders are gained. Traditional clay-based binders are brittle and prone to dusting. In contrast, polymeric binders are more forgiving in terms of mechanical as well as thermal stress and provide great flexibility in forming, handling and operating methods. For instance, considering adsorbent fibers with a polymeric binder, dusting can be eliminated or significantly reduced so that process schemes with circulating or fluidized adsorbent beds can be envisioned. Alternatively, depressurization and repressurization steps in large PSA systems can be shortened, thus shortening the cycle time and ultimately increasing the throughput of a given PSA. The invention also provides greater flexibility with regard to activation temperatures. Because of their heat exposure property, they may withstand relatively high activation temperatures that prior art beads cannot handle without suffering significant decreases in the adsorbent capacity.

The invention may be contrasted with the prior solutions.

In the past, multiple polymeric binders have been proposed to form various adsorbent structures. For instance, U.S. Pat. No. 6,451,723 discloses the use of polysulfone (PSU) to form mix-matrix 13X-PSU adsorbent structures. However, polysulfone (PSU) comes with a heat deflection temperature (HDT) of only 174° C. at 1.8 MPa and a glass transition temperature (Tg) of 185° C. These two parameters are important figures to look at—among others—as they offer insights on how the resulting adsorbent bed structures will handle mechanical load under temperature. Specifically, the HDT is the temperature at which a polymer sample deforms under a specified mechanical load. Indeed, as a thermoplastic polymer is exposed to increasing temperatures, its mechanical properties can weaken more or less abruptly close to the glass transition temperature (Tg). Regarding the latter, it is highly desirable to stay under the glass transition temperature of a given polymer in order to avoid/mitigate a collapse of the pore structures. Such a collapse will have detrimental impact on both adsorbent capacity and kinetics, especially when using impermeable polymers such as aramids.

U.S. Pat. No. 8,133,308 proposes to form a supported sorbent fiber. Specifically, a thin layer of a matrix adsorbent—cellulose acetate is deposited on the outside diameter of a non-sorbent hollow fiber. However, cellulose acetate (CA) comes with a heat deflection temperature (HDT) of only 86° C. at 1.8 MPa and 105° C. at 0.45 MPa as well as a glass transition temperature (Tg) of 130° C.

The foregoing described prior proposed thermoplastic polymers exhibit relatively low Tg's and are therefore not suitable for high-temperature activation/regeneration (e.g. >250° C.). In addition, considering large structured adsorbent systems of several cubic meters, the properties of the selected polymer as well as the constraints related to forming becomes critical as one has to look for additional key parameters (e.g. HDT, impact resistance) that are of no concern when making small size adsorbent structures (e.g. of a few liters).

U.S. Pat. No. 7,592,284 discloses the use of multiple generic polymer families, including thermoset and thermoplastic polymers. Thermoset polymers are typically obtained from a thermosetting resin, a pre-polymer in a soft solid or viscous state, which changes irreversibly into an infusible, insoluble polymer network by curing. During the curing, cross-linking reactions occur resulting in the forming of a rigid three dimensional polymeric structure. Curing can be induced by the action of heat. In contrast, the inventive fiber do not thermally cross-link in the absence of a cross-linking agent and optional cross-linking promoter.

Although thermoset polymers generally speaking are better suited for high temperature requirements, the tuning of the resulting porosity can be challenging. Thermoset polymers can also emit VOCs, even after curing, which can be an issue for front end purification (FEP) processes upstream cryogenic processes as undesirable VOCs will condensate and accumulate on heat exchangers. Chemical resistance as well as impact resistance can also be a problem with thermoset polymers which can be brittle and therefore crack under mechanical or thermal stress. Such a scenario would negatively impact the performance of a monolithic bed as cracks would create preferential paths for the gas, thus leading to an early breakthrough.

In contrast to prior art solutions, the invention provides a solution of activation of many adsorbents having a high temperature activation. For example, some applications such as LiX based zeolite for N2/O2 separation or CO2 capture using NaX zeolite typically requires high temperature activations. For instance, LiX based zeolite can require activation up to 450° C. while NaX zeolite can require 330° C. activation so as to reach the full adsorbent capacity. The inventive fiber not only accommodate high temperature requirements but also guarantee the structural and mechanical integrity of adsorbent systems.

Considering a 300° C. regeneration event on an axial-flow-configured TSA of an ASU, heat is brought to the bed from say the top of the bed and the temperature is measured/monitored at the other end of the bed, in this case, the bottom. Depending on the heat ramp protocol, the top end of the bed can be subjected to hours-long high-heat events while the bottom end may see shorter high-heat events. Therefore, the inventive fiber provide an adsorbent system solution that exhibits high-heat resistance over several hours and will withstand long enough the necessary activation/regeneration temperature.

EXAMPLES

Example 1: Making and Characterization of 13X-MPDIT Fiber for $CO_2$

In a first example, high temperature adsorbent fiber have been prepared by first putting 20 wt % of MPD-IT in NMP solvent without salt. Next, adsorbent powder of sodium based 13X zeolite commercially available was added to the dope so that once coagulated, the adsorbent fiber would be loaded with 80 wt % of zeolite. Specifically, the zeolite powder was mixed with the dope using a high speed mixer and then let degassed. The fiber loading in 13X was adjusted so as to be able to sustain a subsequent handling process. The resulting fiber was then washed in methanol, air dried at room temperature and finally activated at 275° C. The resulting $CO_2$ isotherm was generated and compared to a benchmark (commercial beads).

Figure 1:
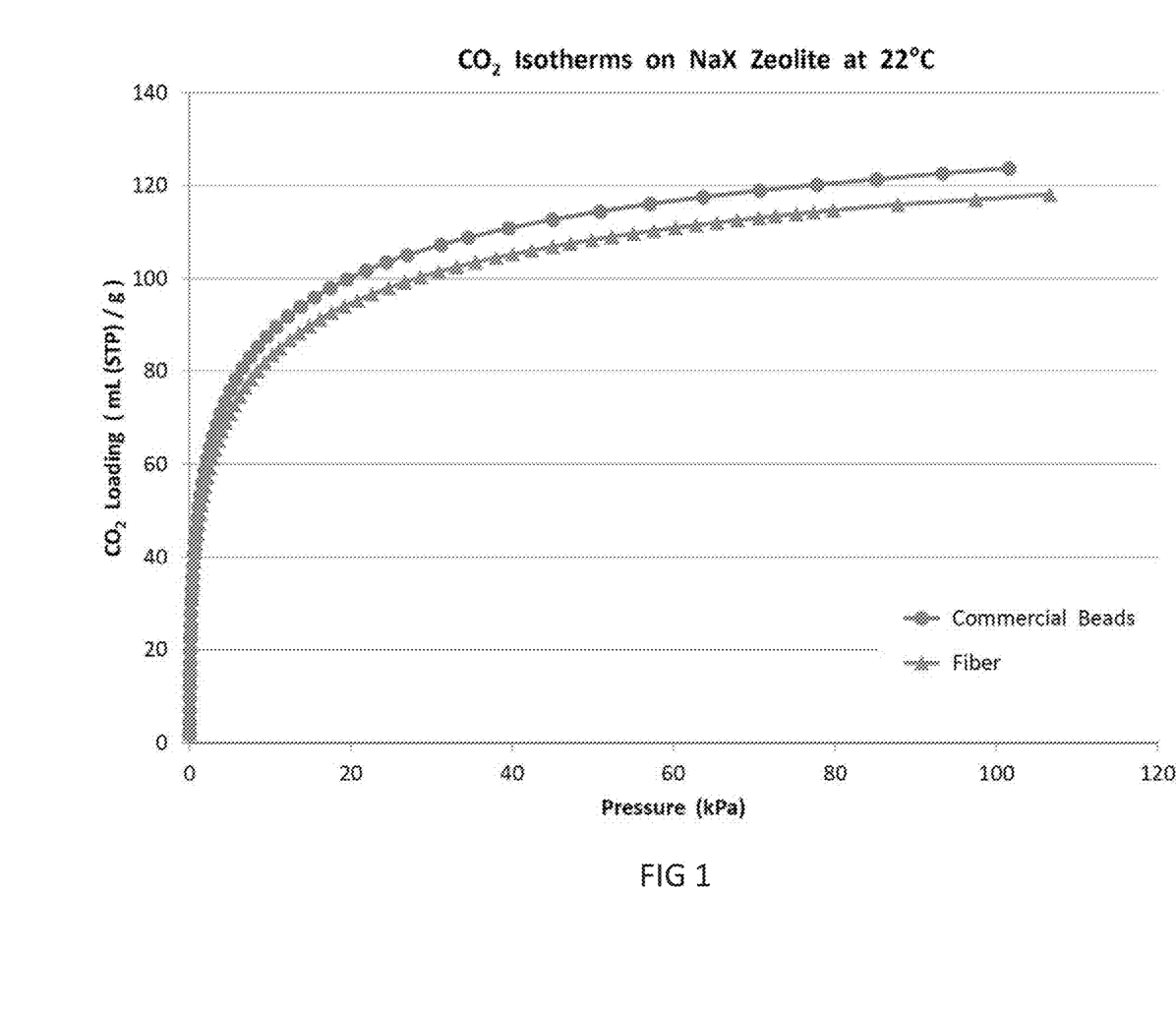
FIG. 1 is a graph of the $CO_2$ isotherms for fiber produced according to Example 1 vs. the $CO_2$ isotherms for commercial beads.

FIG. 1 shows the $CO_2$ isotherms on the Example 1 adsorbent fiber vs. the $CO_2$ isotherms for commercial beads. The fiber was activated at 275° C. whereas the commercial beads were activated at 330° C. Both isotherms were generated at 22° C.

Example 2: Impact of the Temperature of Activation on the $CO_2$ Adsorbent Capacity of a NaX-Adsorbent Fiber with MPD-IT as Binder In a second example, high temperature adsorbent fiber were prepared by first putting 20 wt % of MPD-IT in NMP solvent without salt. Next, adsorbent powder of sodium based 13X zeolite commercially available was added to the dope so that once coagulated, the adsorbent fiber would be loaded with 75 wt % of zeolite. Specifically, the zeolite powder was mixed with the dope using a high speed mixer and then let degassed. The resulting fiber were then washed in methanol, air dried at room temperature and activated under high temperature treatment. Specifically, a first fiber was activated at 275° C. and a $CO_2$ isotherm carried out. A second fiber was activated at 330° C., beyond the Tg of the polymer, before carrying a $CO_2$ isotherm.

Figure 2:
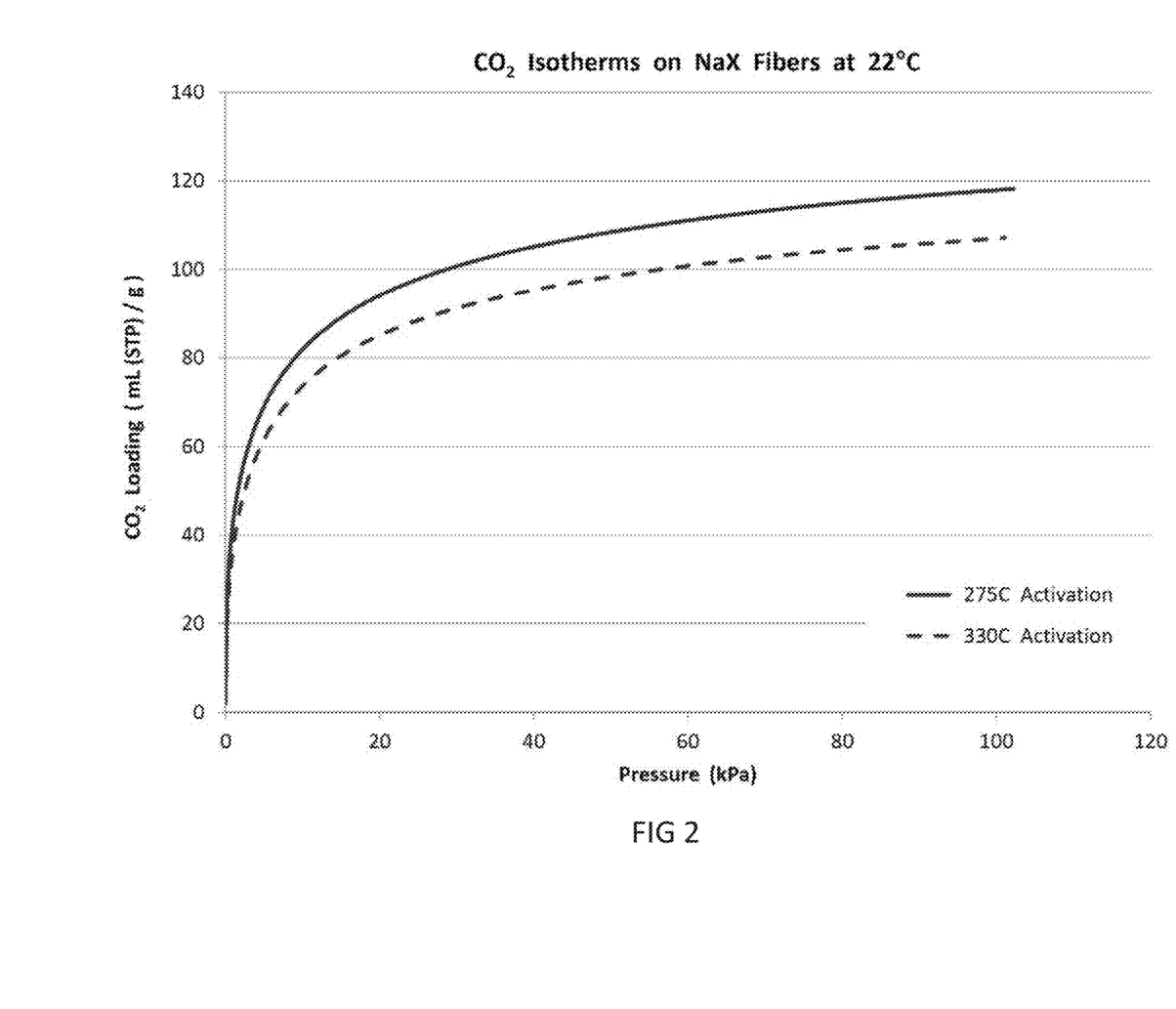
FIG. 2 is a graph of the $CO_2$ isotherms vs. activation temperature for the fiber produced according to Example 2.

FIG. 2 shows the $CO_2$ isotherms vs. activation temperature, more particularly, it illustrates the impact on the adsorbent capacity of activating below and above the glass transition temperature. Specifically, the fiber activated at 330° C. exhibit a lower $CO_2$ capacity as the polymer flowed and recovered part of the zeolite crystals.

What is claimed is:

1. Composite fiber for sorbent-based fluid separations each of which comprises sorbent particles in a polymeric matrix, wherein:
   the polymeric matrix comprises a polymeric binder or blend of polymeric binders;
   the polymeric binder or blend of polymeric binders comprises at least one thermoplastic polymer;
   the polymeric binder or blend of polymeric binders is able to withstand exposure to temperatures at or above 220° C. without significant detrimental effect upon the sorbent capacity of the sorbent particles;
   the fiber exhibits an elongation at break of at least 5% (preferably of at least 7% more preferably of at least 10% and even more preferably of at least 15%);
   said fiber having been produced by temperature-induced phase separation (TIPS) or diffusion-induced phase inversion (DIPS) from a polymer dope suspension that comprises the thermoplastic polymer, optionally dissolved in a solvent in the case of DIPS, and the sorbent particles either suspended in the solvent in the case of DIPS or suspended in thermoplastic polymer while in the molten state in the case of TIPS;
   the sorbent is an adsorbent or absorbent; and
   the sorbent particles are present in the extrudates at a concentration of at least 50 wt %.

2. The fiber of claim 1, wherein the polymeric binder or blend of polymeric binders has a Vicat softening temperature or a heat deflection temperature of at least 220° C.

3. The fiber of claim 1, wherein the polymeric binder or blend of polymeric binders has a Vicat softening temperature or a heat deflection temperature of at least 240° C.

4. The fiber of claim 1, wherein the polymeric binder or blend of polymeric binders has a Vicat softening temperature or a heat deflection temperature of at least 250° C.

5. The fiber of claim 1, wherein the polymeric binder or blend of polymeric binders has a Vicat softening temperature or a heat deflection temperature of at least 270° C.

6. The fiber of claim 1, wherein the polymeric binder or blend of polymeric binders has a Vicat softening temperature or a heat deflection temperature of at least 300° C.

7. The fiber of claim 1, wherein the polymeric binder or blend of polymeric binders has a Vicat softening temperature or a heat deflection temperature of at least 330° C.

8. The fiber of claim 1, wherein the polymeric binder or blend of polymeric binders has a Vicat softening temperature or a heat deflection temperature of at least 360° C.

9. The fiber of claim 1, wherein the polymeric binder or blend of polymeric binders has a Vicat softening temperature or a heat deflection temperature of at least 400° C.

10. The fiber of claim 1, wherein the polymeric binder or blend of polymeric binders has a glass transition temperature(s) of at least 220° C.

11. The fiber of claim 1, wherein the polymeric binder or blend of polymeric binders has a glass transition temperature(s) of at least 240° C.

12. The fiber of claim 1, wherein the polymeric binder or blend of polymeric binders has a glass transition temperature(s) of at least 250° C.

13. The fiber of claim 1, wherein the polymeric binder or blend of polymeric binders has a glass transition temperature(s) of at least 260° C.

14. The fiber of claim 1, wherein the polymeric binder or blend of polymeric binders has a glass transition temperature(s) of at least 270° C.

15. The fiber of claim 1, wherein the polymeric binder or blend of polymeric binders has a glass transition temperature(s) of at least 300° C.

16. The fiber of claim 1, wherein the polymeric binder or blend of polymeric binders has a glass transition temperature(s) of at least 330° C.

17. The fiber of claim 1, wherein the polymeric binder or blend of polymeric binders has a glass transition temperature(s) of at least 360° C.

18. The fiber of claim 1, wherein the polymeric binder or blend of polymeric binders has a glass transition temperature(s) of at least 400° C.

19. The fiber of claim 1, wherein the adsorbent is selected from the group consisting of zeolite, activated carbon, carbon molecular sieve, activated alumina, silica gel, metalorganic frameworks, and amines in solid form.

20. The fiber of claim 1, wherein the thermoplastic polymer is selected from the group consisting of polyetherimides, polyimides, polyamides, polyamide-imides, polyaramids, ladder-type polymers, polybenzimidazole (PBI), polybenzoxazole (PBO), and polybenzothiazole (PBT).

21. The fiber of claim 1, wherein the thermoplastic polymer is selected from the group consisting of polybenzimidazole, polybenzoxazole, and polybenzothiazole.

22. The fiber of claim 1, wherein the polymer dope suspension further comprises one or more types of cross-linking agents, and after formation by diffusion-induced phase separation, the polymeric matrix is caused to be cross-linked with the cross-linking agent(s).

23. The fiber of claim 1, wherein after formation by diffusion-induced phase separation, the fiber are impregnated with one or more types of cross-linking agents and the polymeric matrix is caused to be cross-linked with the cross-linking agent(s).

24. The fiber of claim 1, wherein the polymer dope suspension further comprises one or more polymers insoluble in the solvent.

25. The fiber of claim 24, wherein the soluble thermoplastic polymer and the insoluble polymer(s) have a same molecular formula but the insoluble polymer(s) has a higher molecular weight or degree of crystallinity.

26. The fiber of claim 1, further comprising one or more inorganic fillers incorporated in the polymeric matrix.

27. The fiber of claim 26, wherein the one or more inorganic fillers are selected from carbon fibers and glass fibers.

28. The fiber of claim 1, wherein the polymeric matrix includes a one or more polyaramids and derivatives thereof.

29. The fiber of claim 1, wherein the polymeric matrix includes a one or more polyaramids selected from MPD-I, MPD-IT, DAM-IT, and derivatives thereof.

30. A method for activation of the fiber of claim 1, comprising the step of heating the fiber to a predetermined activation temperature of the sorbent.

31. The method of claim 30, wherein the predetermined activation temperature is at least 220 C.

32. The method of claim 30, wherein the predetermined activation temperature is at least 240 C.

33. The method of claim 30, wherein the predetermined activation temperature is at least 250 C.

34. The method of claim 30, wherein the predetermined activation temperature is at least 270 C.

35. An adsorbent bed for adsorption-based fluid separations comprising one or more of the fiber activated by the method of claim 30.

36. Method for adsorption-based gas separation, comprising the step of separating a feed gas, including at least first and second gases, with one or more of the adsorbent beds of claim 35 to produce a first stream of gas that is enriched in the first gas in comparison to the feed gas and a second stream of gas that is enriched in the second gas in comparison to the feed gas, wherein the feed gas is separated by said one or more adsorbent beds by pressure swing adsorption, pressure-temperature swing adsorption, temperature swing adsorption, vacuum swing adsorption, vacuum-pressure swing adsorption, or electro swing adsorption.

37. The method of claim 36, wherein the feed gas is separated by said one or more adsorbent beds by pressure swing adsorption.

38. The method of claim 37, wherein the feed gas is syngas or a process gas from a syngas production process and the first gas is hydrogen.

39. The method of claim 37, wherein the first gas is CO2 and the second gas is N2.

40. The method of claim 37, wherein the first gas is CO2 and the second gas is CH4.

41. The method of claim 36, wherein the feed gas is separated by said one or more adsorbent beds by temperature swing adsorption, the feed gas is air and the first gas is either water or CO2.

42. The method of claim 36, wherein the feed gas is air, the feed gas is separated by said one or more adsorbent beds by vacuum swing adsorption or vacuum-pressure swing adsorption, and either the first gas is oxygen and the second gas is nitrogen and or the first gas is nitrogen and the second gas is oxygen.

* * * * *